No. 617,637. Patented Jan. 10, 1899.
J. N. CAREY.
VARIABLE DRIVING GEAR FOR CYCLES.
(Application filed Apr. 14, 1898.)
(No Model.) 2 Sheets—Sheet 1.

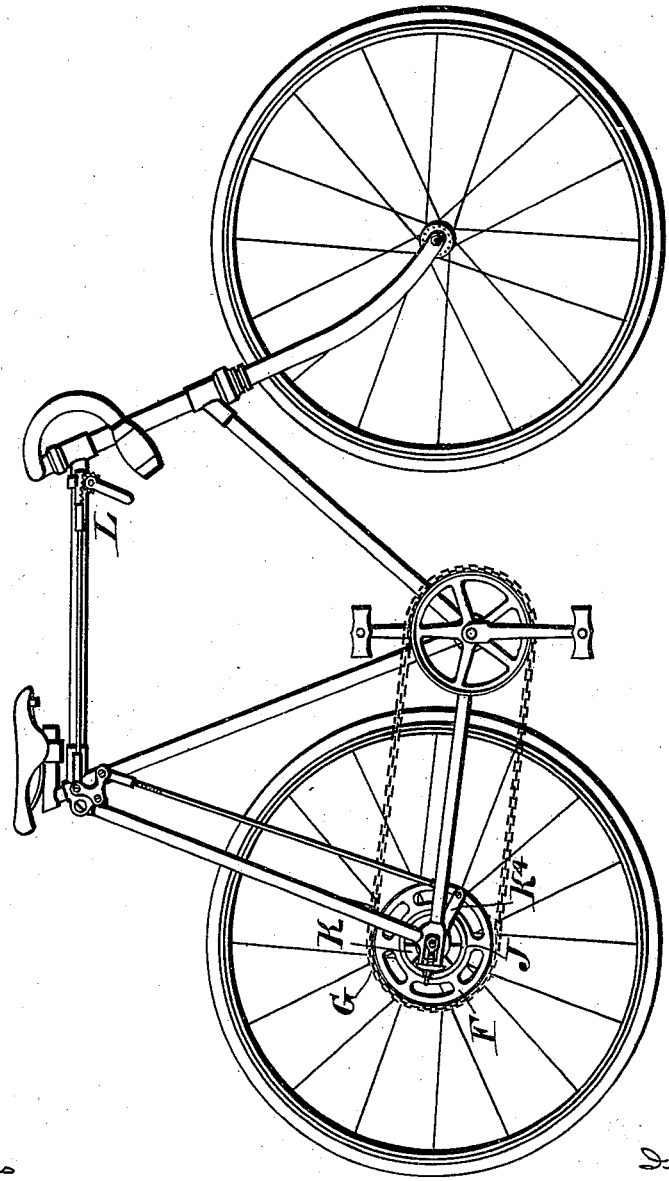

UNITED STATES PATENT OFFICE.

JOHN NOEL CAREY, OF WILLIAMSTOWN, VICTORIA.

VARIABLE DRIVING-GEAR FOR CYCLES.

SPECIFICATION forming part of Letters Patent No. 617,637, dated January 10, 1899.

Application filed April 14, 1898. Serial No. 677,603. (No model.)

*To all whom it may concern:*

Be it known that I, JOHN NOEL CAREY, gentleman, a subject of the Queen of Great Britain, residing at No. 63 Melbourne road, Williamstown, near Melbourne, in the British Colony of Victoria, have invented Improved Variable Driving-Gear and Brake for Cycles, (for which I applied for a patent in Victoria, numbered 14,933, on the 29th day of January, 1898,) of which the following is a specification.

This improved variable driving-gear and brake has been devised with a view to supplying cyclists with a gear which will give them perfect control over their machines under all circumstances—that is to say, it is designed so that the gear can be altered to whatever is found best suited to the requirements at any particular time without having to dismount from the machine, while at the same time in coasting a brake is provided which is operated by merely keeping the feet stationary.

As a matter of convenience I will in order to facilitate a clear understanding of my invention describe it by reference to the accompanying drawings, in which—

Figure 1:
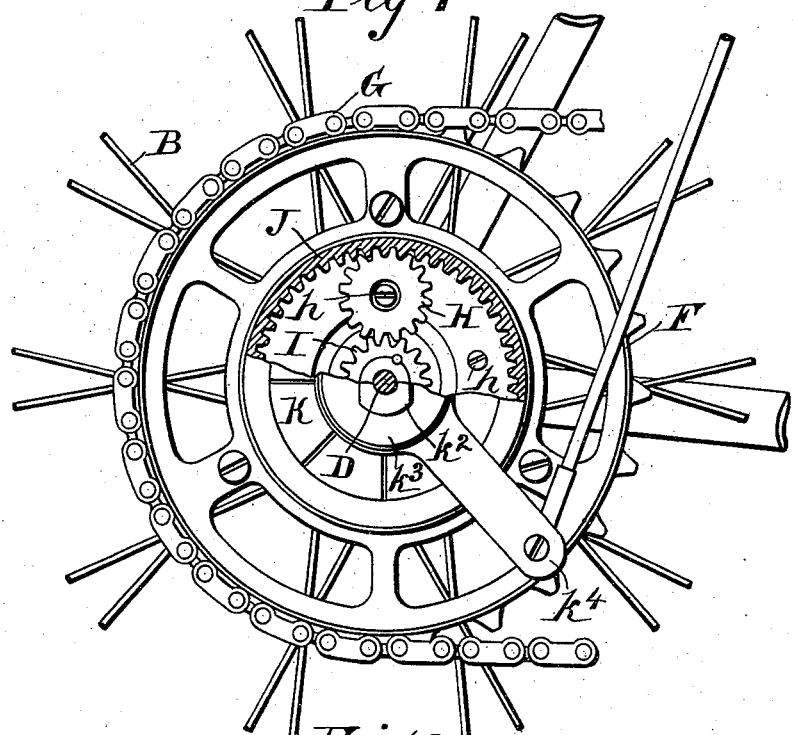
Figure 2:
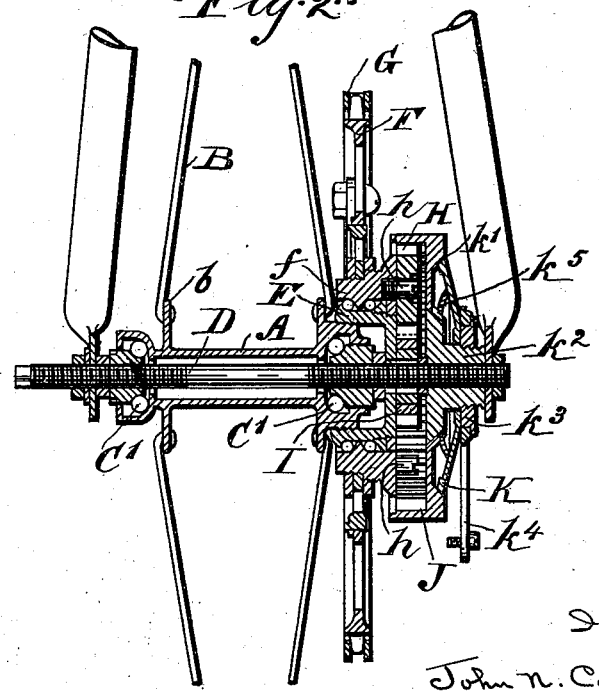

Figure 1 is a side elevation, partly in section, of my improved variable driving-gear and brake for cycles, showing same as applied to the hub of the rear wheel of a chain-driven bicycle. Fig. 2 is a vertical transverse section on line 2 2, Fig. 1. Fig. 3 is a side elevation of a bicycle drawn to a smaller scale and showing it fitted with my improved variable driving-gear and brake.

The same letters of reference indicate the same parts in all the figures.

A represents the hub of the main drive-wheel of a bicycle, showing it constructed in the usual barrel form and constructed with the usual flanges $b$ for the attachment of the inner ends of the spokes B. It is mounted on ball-bearings $C'$, carried by a spindle D, secured at each end between the back forks of the frame of the machine in the usual way.

E represents an extension of the hub, which is screwed or otherwise secured upon one side or the other and which carries the hub $f$ of a sprocket-wheel F, to which motion may be imparted by a chain G in the ordinary way from a similar sprocket-wheel upon the crank-axle. One great feature of my improved gear is that the sprocket-wheel F and the sprocket-wheel on the crank-axle can be the same size, with this advantage gained that the drive-chain will travel slowly and by acting upon a large pinion will have more direct effect in turning the wheel than it would have if it were acting upon only a small pinion. The hub $f$ of the sprocket-wheel F has projecting from it a set of studs $h$, upon any of which can be placed an intermediate or idle pinion, such as is illustrated at H, said pinion varying in size according to the highest gear desired by the rider. This pinion H is arranged to gear with another pinion I, keyed or otherwise secured to the extension E of the hub A, so as to rotate therewith, while the outer periphery of said pinion H is arranged to gear with the teeth of an internally-toothed wheel or drum J, which is fitted loosely over the gearing and is not connected directly with any part of the mechanism. In other words, it is under normal circumstances a loose internally-toothed drum. The outer face of this loose drum J is formed with a coned recess $k'$, in which fits an expansion locking-disk K, constructed, as illustrated in Figs. 1 and 2, with a number of radial parts, each of which forms a stout spring. The whole of this is dish-shaped, and its periphery just fits within the recess $k'$ of the drum J.

Upon the spindle D is a bushing $k^2$, carrying a nut $k^3$, fitted with a lever $k^4$, whereby it can be partially rotated, (preferably through the medium of suitable connecting-rods, rack and pinion, and a handle, as shown in Fig. 3,) so as to force it against the face of the locking-disk K, the effect being to compress said disk, thereby forcing its periphery outward against the recess $k'$ of the drum J, and thus securely holding said drum against rotation. The effect in such a case will be to communicate a proportionately-accelerated motion to the pinion I and therefore to the drive-wheel of the machine, because as the sprocket-wheel F rotates and carries the pinion H around with it this latter by rolling around the interior of the drum J will rotate the pinion I in the opposite direction, and thus the accelerated rotary motion will be imparted to said pinion I in a certain degree, according to the proportion between the two pinions H and I. If the nut $k^6$ is slacked back, the spring $k^5$ behind the locking-disk K will release said disk, the effect being to allow the drum J to revolve in the same direction, but only at a rate proportionate to the pressure set up by the locking-disk K. The gearing by this means will be reduced down to a proportionate extent until the travel of said drum is equal to the travel of the sprocket-wheel F, the effect on the gearing being that the crank-axle will make one revolution for each revolution of the back drive-wheel— that is, the gearing will be reduced down to twenty-six or twenty-eight inch, according to the size of said back wheel.

In practice I propose to arrange my improved gearing so that when the drum J is locked the gearing will be set at the highest gear found suitable for the rider on good roads. If he wants to reduce it, he can easily do so down to, say, twenty six or eight by merely slacking back the nut $k^3$. The gear can be used as a brake by more or less slacking back this nut and keeping the feet stationary, the effect being that the friction set up against the drum J will act as a very efficient brake, which can be relied upon under all circumstances, will be continuous in action, and not liable to get out of order.

It will be obvious that the nut $k^3$ for operating the locking-disk K can be rotated in many different ways, but it is preferable to connect the arm or lever $k^4$ by the gearing illustrated in Fig. 3 to the rack and pinion L.

If it is preferred to use chainless drive-gear instead of sprocket-gear in connection with my invention, it will simply involve the substitution of a bevel-pinion or miter-wheel for the sprocket-wheel F and a shaft with bevel-pinions on the ends for the chain G, as will be readily understood by all practical cycle manufacturers.

One great advantage of my improved gearing is that it can be fixed to an ordinary machine by the purchaser without requiring a large amount of mechanical skill.

Having now particularly described and ascertained the nature of my said invention and in what manner the same is to be performed, I declare that what I claim is—

1. In variable driving-gear for cycles, the combination with the wheel-spindle and the driving-wheel journaled thereon, of a gear-wheel fixed on the hub of the drive-wheel, a sprocket-wheel journaled on said hub, a loose internal gear-wheel, a planet gear-wheel mounted on a journal fixed on the sprocket-wheel and gearing with the internal gear-wheel and the gear-wheel fixed on the hub, and means for braking the internal gear-wheel, substantially as described.

2. In variable driving-gear for cycles, the combination with the wheel-spindle and the driving-wheel journaled thereon, of a gear-wheel fixed on the hub of the drive-wheel, a sprocket-wheel journaled on said hub, a loose internal gear-wheel, a planet gear-wheel mounted on a journal fixed on the sprocket-wheel and gearing with the internal gear-wheel and the gear-wheel fixed on the hub, and a friction-brake for retarding or arresting the rotation of said internal gear-wheel, substantially as described.

3. In variable driving-gear for cycles, the combination with the wheel-spindle and the driving-wheel journaled thereon, of a gear-wheel fixed on the hub of the drive-wheel, a sprocket-wheel journaled on said hub, a loose internal gear-wheel having an annular recess in its face, an expansible disk, means for expanding said disk in said recess to retard or arrest the rotation of the internal gear-wheel, and a planet gear-wheel mounted on a journal fixed on the sprocket-wheel and gearing with the internal gear-wheel and the gear-wheel on the hub, substantially as described.

4. In variable driving-gear for cycles, the combination with the wheel-spindle and the driving-wheel journaled thereon, of a gear-wheel fixed on the hub of the drive-wheel, a sprocket-wheel journaled on said hub, a sleeve fixed on the spindle, an internal gear-wheel journaled on said sleeve and having an internal recess in its face, a split disk arranged on said sleeve, a nut for expanding said disk in frictional contact with the wall of said recess, and a planet gear-wheel mounted on a journal fixed on the sprocket-wheel and gearing with the internal gear-wheel and the gear-wheel on the hub, substantially as described.

5. In variable driving-gear for cycles, the combination with the wheel-spindle and the driving-wheel journaled thereon, of a gear-wheel fixed on the hub of the drive-wheel, a sprocket-wheel journaled on said hub, a sleeve fixed on the spindle, an internal gear-wheel journaled on said sleeve and provided with an annular dished recess in its face, a radially-split disk arranged on said sleeve, a nut for expanding said disk in frictional contact with the wall of said recess, a spring for throwing said disk out of frictional contact with the wall of the recess, and a planet gear-wheel mounted on a journal fixed on the sprocket-wheel and gearing with the internal gear-wheel and the gear-wheel on the hub, substantially as described.

JOHN NOEL CAREY.

Witnesses:
EDWARD WATERS, Jr.,
EDWIN WILSON.